(12) United States Patent
Shin et al.

(10) Patent No.: US 10,712,317 B2
(45) Date of Patent: Jul. 14, 2020

(54) APPARATUS FOR DETECTING DEFECT AND METHOD FOR DETECTING DEFECT USING THE SAME

(71) Applicants: Dong Hwan Shin, Busan (KR); Ye Ji Shin, Busan (KR); Seung Eun Cha, Busan (KR)

(72) Inventors: Dong Hwan Shin, Busan (KR); Ye Ji Shin, Busan (KR); Seung Eun Cha, Busan (KR)

( * ) Notice: Subject to any disclaimer, the term of this patent is extended or adjusted under 35 U.S.C. 154(b) by 0 days.

(21) Appl. No.: 15/760,222

(22) PCT Filed: Aug. 8, 2017

(86) PCT No.: PCT/KR2017/008552
§ 371 (c)(1),
(2) Date: Mar. 14, 2018

(87) PCT Pub. No.: WO2018/182103
PCT Pub. Date: Oct. 4, 2018

(65) Prior Publication Data
US 2020/0011836 A1 Jan. 9, 2020

(30) Foreign Application Priority Data
Mar. 30, 2017 (KR) .................. 10-2017-0040536

(51) Int. Cl.
*G01N 29/04* (2006.01)
*G01N 29/06* (2006.01)
(Continued)

(52) U.S. Cl.
CPC ....... *G01N 29/043* (2013.01); *G01N 29/0609* (2013.01); *G01N 29/07* (2013.01);
(Continued)

(58) Field of Classification Search
CPC ....... G01N 2291/011; G01N 2291/102; G01N 2291/267; G01N 29/043; G01N 29/0609;
(Continued)

(56) References Cited

U.S. PATENT DOCUMENTS

| | | | |
|---|---|---|---|
| 2009/0199642 A1* | 8/2009 | Fukutomi | G01N 29/069 73/598 |
| 2013/0151171 A1 | 6/2013 | Mizota et al. | |
| 2015/0160167 A1* | 6/2015 | Kawasaki | G01N 29/069 73/598 |

FOREIGN PATENT DOCUMENTS

| | | |
|---|---|---|
| JP | H10332648 A | 12/1998 |
| JP | 2005148009 A | 6/2005 |

(Continued)

OTHER PUBLICATIONS

Written Opinion for PCT/KR2017/008552 dated Dec. 27, 2017.
International Search Report for PCT/KR2017/008552 dated Dec. 27, 2017.

*Primary Examiner* — Nimeshkumar D Patel
*Assistant Examiner* — Nashmiya S Fayyaz
(74) *Attorney, Agent, or Firm* — Renaissance IP Law Group LLP

(57) ABSTRACT

The present disclosure relates to an apparatus for detecting a defect and a method for detecting a defect using the same, and more particularly, to an apparatus for detecting a defect and a method for detecting a defect using the same for detecting a defect inside an inspection object without destructing the inspection object.

An apparatus for detecting a defect according to an embodiment of the present invention includes a first probe unit configured to transmit a signal into an inspection object and receive a signal generated inside the inspection object, a second probe unit separately installed from the first probe unit and configured to receive the signal generated inside the (Continued)

inspection object, and a position determining unit configured to detect a defect position inside the inspection object using the signal received by the first probe unit and the signal received by the second probe unit.

14 Claims, 7 Drawing Sheets

(51) Int. Cl.
*G01N 29/07* (2006.01)
*G01N 29/22* (2006.01)
*G01N 29/24* (2006.01)
*G01N 29/36* (2006.01)

(52) U.S. Cl.
CPC ....... *G01N 29/225* (2013.01); *G01N 29/2437* (2013.01); *G01N 29/36* (2013.01); *G01N 2291/011* (2013.01); *G01N 2291/102* (2013.01); *G01N 2291/267* (2013.01)

(58) Field of Classification Search
CPC .. G01N 29/07; G01N 29/225; G01N 29/2437; G01N 29/36
USPC .......................................................... 73/598
See application file for complete search history.

(56) References Cited

FOREIGN PATENT DOCUMENTS

| | | | |
|---|---|---|---|
| JP | 2005274583 | A | 10/2005 |
| JP | 2006162321 | A | 6/2006 |
| JP | 2013088240 | A | 5/2013 |
| KR | 101141113 | B1 | 5/2012 |
| KR | 20150115725 | A | 10/2015 |

\* cited by examiner

APPARATUS FOR DETECTING DEFECT AND METHOD FOR DETECTING DEFECT USING THE SAME

TECHNICAL FIELD

The present invention relates to an apparatus for detecting a defect and a method for detecting a defect using the same, and more particularly, to an apparatus for detecting a defect and a method for detecting a defect using the same for detecting a defect inside an inspection object without destructing the inspection object.

BACKGROUND ART

Typically, in life prediction and integrity evaluation of components or materials, information on a defect position is very important, which requires an accurate and fast detection technique.

Pulse echo technique, which is one of existing nondestructive defect detection techniques, is a technique for detecting a defect according to an amplitude of energy reflected by the defect existing inside an inspection object. However, it is difficult to measure an accurate size of the defect, since the amplitude of the reflected energy is dependent on a state of a reflection surface.

In contrast, as a defect detection technique using a diffraction phenomenon of a wave, time of flight diffraction method (TOFD) has a 10 times or more faster inspection speed than the pulse echo technique, enables an inspector to easily detect a defect, and does not depend on a direction of the defect, and therefore it gets spotlighted as a stable inspection method.

The TOFD is a technique for transmitting a wave to an inspection object, namely, a medium, using a transmission probe and a reception probe and analyzing a defect position such as a discontinuity inside the inspection object. The wave transmitted from the transmission probe passes through the medium to collide with the defect therein, and generate a diffraction wave. The generated diffraction wave is received by the reception probe, and the defect position is detected by measuring a time when the wave is transmitted from the transmission probe and a time when the diffraction wave is received by the reception probe.

However, for the TOFD, since only an overall movement distance between the transmission wave and the diffraction wave generated thereby is measured, it is difficult to accurately measure a three-dimensional position of the defect existing inside the inspection object, which includes a defect position on the surface of the inspection object, a defect depth from the surface of the inspection object, and the like.

PRIOR ART REFERENCE

Korean Patent Application Laid-open Publication No. 10-2015-0115725 A

DISCLOSURE OF THE INVENTION

Technical Problem

The present invention provides an apparatus for detecting a defect and a method for detecting a defect using the same capable of detecting an accurate defect position existing inside an inspection object without destructing the inspection object.

Technical Solution

In accordance with an exemplary embodiment, an apparatus for detecting a defect includes: a first probe unit configured to transmit a signal into an inspection object and receive a signal generated inside the inspection object; a second probe unit separately installed from the first probe unit and configured to receive the signal generated inside the inspection object; and a position determining unit configured to detect a defect position inside the inspection object using the signal received by the first probe unit and the signal received by the second probe unit.

The first probe unit and the second probe unit may be movably installed along a surface of the inspection object.

The signal generated inside the inspection object may include a diffraction signal that the signal transmitted from the first probe unit is diffracted by a defect.

The position determining unit may determine the defect position inside the inspection object using an interval L between the first probe unit and the second probe unit, a distance $S_1$ from the first probe unit to the defect, and a distance $S_2$ between the second probe unit to the defect.

The distance $S_1$ from the first probe unit to the defect may be calculated using a difference between transmission time of the signal transmitted from the first probe unit and a reception time of the signal received by the first probe unit, and a travel speed of the signal inside the inspection object.

The distance $S_2$ from the second probe unit to the defect may be calculated using a difference between the transmission time of the signal transmitted from the first probe unit and a reception time of the signal received by the second probe unit, the travel speed of the signal inside the inspection object, and the distance $S_1$ from the first probe unit to the defect.

The defect position may include information about a defect depth H to the defect from an inspection surface for connecting between the first probe unit and the second probe unit, and information about planar defect distance ($D_1$ or $D_2$) to the defect from the first probe unit or the second probe unit along the inspection surface.

The defect depth H from the inspection surface to the defect may be calculated by the following Equation 1, $$H = S_1 \sqrt{1 - \left(\frac{S_1^2 + L^2 - S_2^2}{2S_1 L}\right)^2} \quad \text{[Equation 1]}$$

The planar defect distance ($D_1$ or $D_2$) to the defect from the first probe unit or the second probe unit along the inspection surface may be calculated by the following Equation 2, $$D_1 (\text{or } D_2) = \sqrt{S_1^2 (\text{or} S_2^2) - H^2} \quad \text{[Equation 2]}$$

The signal transmitted from the first probe unit may include an ultrasonic wave signal.

In accordance with another exemplary embodiment, a method for detecting a defect includes: a process of separately disposing a first probe unit and a second probe unit on a surface of an injection object; a process of transmitting a signal into the inspection object from the first probe unit; detecting, by the first probe unit and the second probe unit, a signal generated inside the inspection object; and a process of determining whether a defect is present inside the inspection object from the signals detected by the first probe unit and the second probe unit.

In the process of transmitting of the signal into the inspection object, the signal may be transmitted toward a lower portion of the second probe unit.

The method may further includes a process of moving at least one of the first probe unit and the second probe unit along the surface of the inspection object, when the defect is not determined to be present inside the inspection object.

The method may further include a process of determining a defect position inside the inspection object using the signal received by the first probing unit and the signal received by the second probing unit, when the defect is determined to be present inside the inspection object.

In the process of determining of the defect position inside the inspection object, a defect depth H to the defect from an inspection surface for connecting between the first probe unit and the second probe unit, and a planar defect distance ($D_1$ or $D_2$) to the defect from the first probe unit or the second probe unit along the inspection surface may be determined.

The method may further include a process of displaying position coordinates of a defect using position coordinates of the first probe unit and the second probe unit, the defect depth H and the planar defect distance $D_1$ or $D_2$.

Advantageous Effects

According to an apparatus for detecting a defect and a method for detecting a defect using the same according to embodiments of the present invention, a position of a defect existing inside an inspection object may be accurately detected by receiving, by a first probe unit that has been transmitted a signal into the inspection object, a diffraction signal generated by the defect.

In addition, since the defect position is detected using an interval L between the first probe unit and a second probe unit, a distance $S_1$ from the first probe unit to the defect, and a distance $S_2$ from the second probe unit to the defect, the defect position may be detected regardless of a transmission angle of the signal even when the signal spreads and travels inside the inspection object.

Furthermore, according to embodiments of an apparatus for detecting a defect and a method for detecting a defect using the same, since a three-dimensional position of the defect may be accurately calculated according to coordinates of the first and second probe units on the inspection object, a configuration of the apparatus may be simplified and therefore a cost may be reduced and a detection speed may be improved.

MODE FOR CARRYING OUT THE INVENTION

Figure 1:
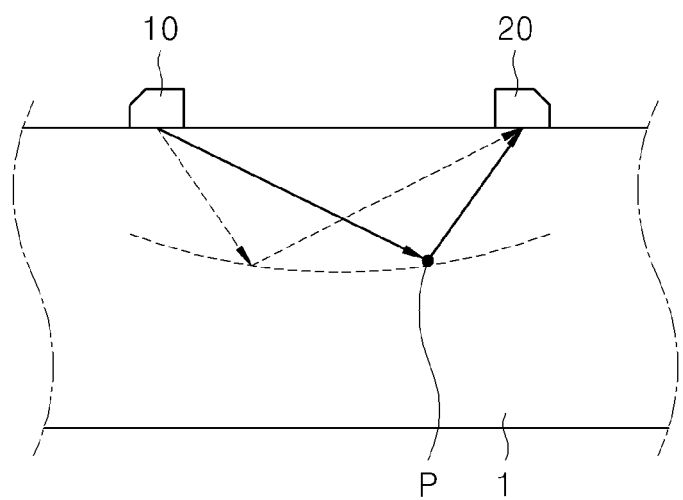
FIG. 1 is a drawing for explaining a typical time of flight diffraction method.

An apparatus for detecting a defect and a method for detecting a defect using the same according to embodiments of the present invention suggest technical features capable of detecting an accurate position of a defect existing inside an inspection object without destructing the inspection object.

Hereinafter, specific embodiments will be described in detail with reference to the accompanying drawings. The present invention may, however, be embodied in different forms and should not be construed as limited to the embodiments set forth herein. Rather, these embodiments are provided so that this invention will be thorough and complete, and will fully convey the scope of the present invention to those skilled in the art. Like reference numerals refer to like elements throughout.

FIG. 1 is a drawing for explaining typical Time Of Flight Diffraction (TOFD) method.

In the TOFD, which is a defect detection technique using a diffraction phenomenon of a sound wave, a wave is transmitted to an inspection object 1, namely, a medium, and a position of a defect P such as a discontinuity inside the inspection object 1 is analyzed using a transmission probe 10 and a reception probe 20.

As illustrated in FIG. 1, the transmission probe 10 in the TOFD method transmits a signal toward the inside of the inspection object 1. When the defect P exists inside the inspection object 1, the signal transmitted from the transmission probe 10 reaches the defect P inside the inspection object 1 to generate a diffraction signal. The generated diffraction signal is received by the reception probe 20, and a time when the signal is transmitted from the transmission probe 10 and a time when the diffraction signal such as a diffraction wave is received by the reception probe 20 are measured to detect the position of the defect P using a time difference between the two times.

However, for the TOFD method, it is difficult to detect an accurate position of the defect P between the transmission probe 10 and the reception probe 20.

In other words, in the TOFD, the position of the defect P is detected using the time difference between the transmission time of the signal from the transmission probe 10 and the reception time of the diffraction wave by the reception probe 20, and this time difference is a sum of a time elapsed while the signal transmitted from the transmission probe 10 travels to the defect P and a time elapsed while the diffraction signal travels from the defect P to the reception probe 20. Accordingly, when this time difference is used, only a distance that a distance from the transmission probe 10 to the defect P is summed with a distance from the defect P to the reception probe 20 may be measured. In this case, since the defect P inside the inspection object 1 may be measured at various positions along an elliptical path illustrated in a dashed line of FIG. 1, it is difficult to accurately measure a three-dimensional position of the defect P existing inside the inspection object 1, which includes a defect position on the surface of the inspection object 1, a depth of the defect P from the surface of the inspection object 1, and the like.

Regarding this, a method is being suggested in which a signal is transmitted in a constant angle from the transmission probe 10 and a position of the defect P is detected from an angle that is formed by the transmitted signal with the surface of the inspection object 1. However, since the signal transmitted from the transmission probe 10 spreads and travels in a circular arc form inside the inspection object 1 and the method may be applied only when the defect P is positioned at the center of the transmitted signal, it is still difficult to measure an accurate position of the defect P inside the inspection object 1.

Figure 2:
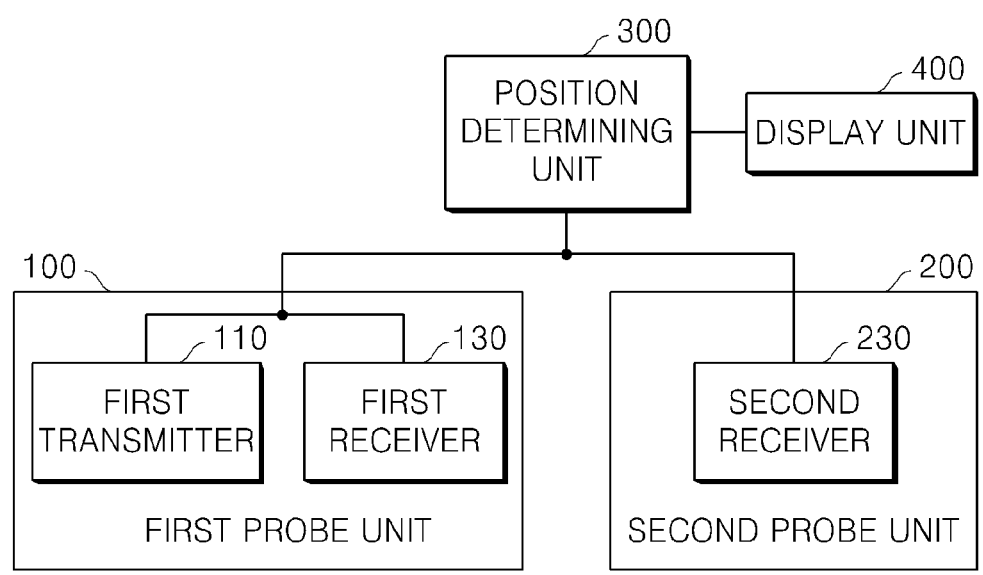
FIG. 2 schematically illustrates configuration elements of an apparatus for detecting a defect in accordance with an exemplary embodiment.

FIG. 2 schematically illustrates configuration elements of an apparatus for detecting a defect in accordance with an exemplary embodiment.

Referring to FIG. 2, an apparatus for detecting a defect according to an embodiment includes: a first probe unit 100 for transmitting a signal into the inspection object 1 and receiving a signal generated inside the inspection object 1; a second probe unit 200 separately installed from the first probe unit 100 to receive a signal generated inside the inspection object 1; and a position determining unit 300 for determining a defect position inside the inspection object 1 using the signals received by the first probe unit 100 and the second probe unit 200.

First, the inspection object 1 may include various objects for detecting internal inspection information using a wave such as a sound wave or an ultrasonic wave. For example, the inspection object 1 may be a basic material including a welding zone or a human body may become the object. In other words, when detecting a defect (such as a tumor) inside the human body, ultrasonic testing or phase array ultrasonic testing is currently mainly used. However, when applying the apparatus for detecting a defect according to the embodiment, a three-dimensional position of a defect inside the human body may be accurately figured out by the TOFD. CT or MRI for figuring out the three-dimensional position of the defect inside the human body may cause a danger such as exposure to radiation or a side effect due to a strong magnetic field, but there is little such a danger in a scheme using an ultrasonic wave. Besides, the apparatus for detecting a defect may also be applied to various equipments such as an active sonar and a radar of a ship through which inspection information may be detected using a wave.

In addition, the defect P includes a discontinuity, etc. capable of generating a diffraction signal. For welding, the discontinuity is variously generated by a weld gap, broadening of a crater, lack of fusion, lack of dissolution, slag insertion, blow hole, worm hole, high temperature broadening, or a material difference with surrounding materials due to inclusion of foreign matter, etc., and includes a crack, a groove, or a foreign matter already present in the inspection object 1, which is not related to welding. Hereinafter, for convenience of explanation, the above described discontinuity will be defined and described as the defect P.

The first probe unit 100 transmits the signal into the inspection object 1 and receives the signal generated from the inside of the inspection object 1 by the transmitted signal. The signal transmitted from the first probe 100 may include various signals using a wave such as a radio wave, a sound wave, or an ultrasonic signal having high directivity. In addition, the signal generated inside the inspection object 1 may include a diffraction signal resulted from the various signals using the wave, which reach the defect and are diffracted thereby. Hereinafter, for convenience of explanation, the signal generated by the defect inside the inspection object 1 will be distinguishably expressed as the diffraction signal.

The first probe unit 100 may include a first transmitter 110 for transmitting a signal into the inspection object 1 and a first receiver 130 for receiving a diffraction signal for the transmitted signal. The first transmitter 110 may transmit a wave signal using a piezoelectric element or a laser and the first receiver 130 receives the diffraction signal that the wave signal is diffracted using a piezoelectric element of an interferometer. The first transmitter 110 and the first receiver 130 are closely disposed to minimize a path difference between the transmitted signal and the received diffraction signal. Since transmitters and receivers of various configurations that respectively transmit a wave signal and receive a diffraction signal therefor may be used as structures of the first transmitter 110 and the first receiver 130, detailed descriptions thereabout will be omitted.

A second probe unit 200 is separately installed from the first probe unit 100 and receives the diffraction signal for the signal transmitted from the first probe unit 100. The second probe unit 200 may include a second receiver 230 for receiving the diffraction signal for the transmitted signal, and in this case, the above-described piezoelectric element or interferometer may be adopted as the second receiver 230.

The second probe unit 200 is separately installed from the first probe unit 100. Here, the second probe unit 200 may be connected and combined to the first probe unit 100 by a connection member, and a separation interval between the first probe unit 100 and the second probe unit 200 may be adjusted using a length-adjustable connection member.

In addition, although not illustrated in FIG. 2, a time measuring sensor for measuring a transmission time of a transmitted signal and a reception time of a diffraction signal received by the first probe unit 100 may be included in the first probe unit 100, and a time measuring sensor for measuring a reception time of a diffraction signal received by the second probe unit 200 may be included in the second probe unit 200. Furthermore, it is natural to include a power supply device for supplying power to each of the first probe unit 100 and the second probe unit 200.

The position determining unit 300 determines a defect position inside the inspection object 1 using the diffraction signal received by the first probe unit 100 and the diffraction signal received by the second probe unit 200.

Hereinafter, a process in which the position determining unit 300 determines the defect position inside the inspection object 1 will be described in detail in relation to FIGS. 3 and 4.

Figure 3:
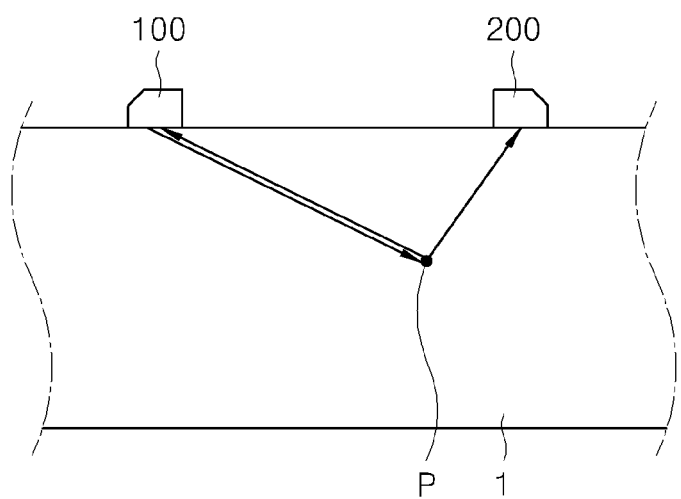
FIG. 3 illustrates a signal travel path of the apparatus for detecting a defect according to an embodiment.
Figure 4:
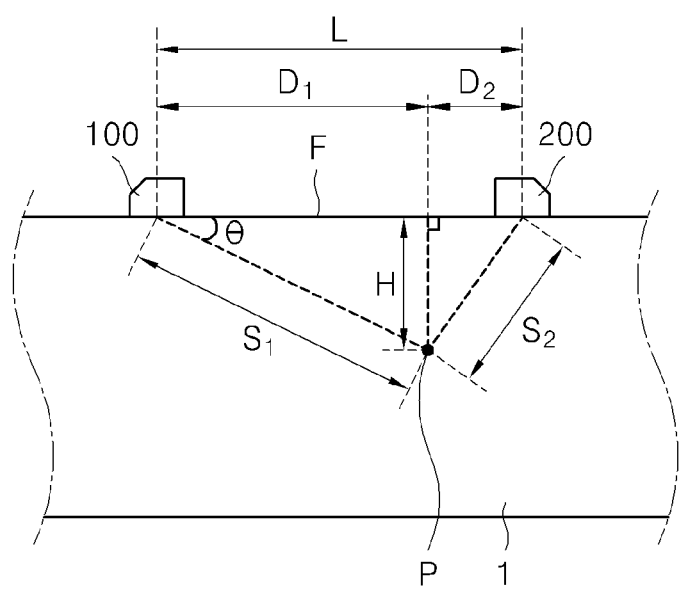
FIG. 4 illustrates how to determine a defect position according to an embodiment.

FIG. 3 illustrates a signal travel path of the apparatus for detecting a defect according to an embodiment, and FIG. 4 illustrates how to determine the defect position according to an embodiment.

Referring to FIGS. 3 and 4, first, the first probe unit 100 and the probe unit 200 are separated from each other and installed on the surface of the inspection object 1. As shown, the first probe unit 100 and the second probe unit 200 may directly contact to be installed on the surface of the inspection object 1, or may be separated in a constant interval and contactlessly installed on the surface of the inspection object 1.

When power is supplied to the first probe unit 100 and the second probe unit 200, the first probe unit 100 generates an electrical signal and the electrical signal is converted to a wave signal to be transmitted into the inspection object 1. When a defect P is not present inside the inspection object 1, only a surface signal propagated along a surface of the inspection object 1 and a back wall signal reflected by a back wall are received for the signal transmitted from the first probe unit 100, and a diffraction signal is not received by the first probe unit 100 and the second probe unit 200. Subsequently, when the diffraction signal is not received by the first probe unit 100 and the second probe unit 200, and defect P is not determined to be present, at least one of the first probe unit 100 and the second probe unit 200, which are moveably installed along the surface of the inspection object 1, is moved to continuously detect the defect P.

On the other hand, when the defect P is present inside the inspection object 1, the signal transmitted into the inspection object 1 generates a diffraction signal due to the defect P, the first probe unit 100 and the second probe unit 200 receives the diffraction signal to detect the defect P. At this point, for the defect P having a certain size, the diffraction signal is mainly generated at an end portion of the defect P, and the diffraction signal generated at the end portion of the defect P may be detected by comparing signal intensities or harmonic components, etc. Hereinafter, for convenience of explanation, the defect P of a point shape is exemplarily described, but when the defect P has a certain size, it is natural that the defect P of the point shape may be applied to the end portion of the defect P.

According to Fermat's principle, since a wave signal travels in a shortest time and minimum distance, when the defect P is present inside the inspection object 1, the signal transmitted from the first probe unit 100 has a signal travel path as illustrated in FIG. 3. In other words, the signal transmitted from the probe unit 100 spreads in a fan shape inside the inspection object 1, and a signal delivered to the defect P travels along a straight line path connecting between the first probe unit 100 and the defect P. When the signal transmitted from the first probe unit 100 is delivered to the defect P, the signal is omni-directionally diffracted by the defect P and diffraction signals are generated. Among the diffraction signals omni-directionally diffracted, a diffraction signal to be delivered to the probe unit 100 travels along the straight line path connecting between the defect and the first probe unit 100, and a diffraction signal to be delivered to the second probe unit 200 travels along a straight line path connecting between the defect P and the second probe unit 200. Accordingly, the signal transmitted from the first probe unit 100 has signal travel paths as arrows shown in FIG. 3.

When the defect P is present inside the inspection object 1, the position determining unit 300 determines a defect position inside the inspection object 1 by using a distance $S_1$ from the first probe unit 100 to the defect P and a distance $S_2$ from the second probe 200 to the defect P. In addition, the defect position determined by the position determining unit 300 may include a defect depth H to the defect P from an inspection surface F connecting between the first probe unit 100 and the second probe unit 200 and information on a planar defect distance ($D_1$ or $D_2$) to the defect P from the first probe 100 or the second probe unit 200 along the inspection surface F. Here, the inspection surface F means a plane perpendicular to a signal travel path and connecting between the first probe unit 100 and the second probe unit 200.

The distance S1 from the first probe unit 100 to the defect P is calculated using a difference between a transmission time of the signal transmitted from the first probe unit 100 and a reception time of the diffraction signal received by the first probe unit 100 and travel speeds of the signal inside the inspection object 1 and the diffraction signal. Furthermore, the distance $S_2$ from the second probe unit 200 to the defect P is calculated using a difference between the transmission time of the signal transmitted from the first probe unit 100 and a reception time of the diffraction signal received by the second probe unit 200, the travel speeds of the signal inside the inspection object 1 and the diffraction signal, and the distance S1 from the first probe unit 100 to the defect P. Here, the travel speed of the signal transmitted from the first probe unit 100 may be equal to the travel speed of the diffraction signal that is generated from the defect P and received by the first probe unit 100 and the second probe unit 200.

For example, when a time difference $t_{11}$ occurs from when the signal is transmitted from the first probe unit 100 until the diffraction signal is generated from the defect P and received by the first probe unit 100, the distance $S_1$ from the first probe unit 100 to the defect P is $v \times t_{11}/2$ where v is the travel speed of the signal and the diffraction signal inside the inspection object 1. In addition, when a time difference $t_{12}$ occurs from when the signal is transmitted from the first probe unit 100 until the diffraction signal is generated from the defect P and received by the second probe unit 200, since a sum of the distance $S_1$ from the first probe unit 100 to the defect P and the distance $S_2$ from the second probe unit 200 to the defect P is $v \times t_{12}$, the distance $S_2$ from the second probe unit 200 to the defect P becomes $v \times (t_{12} - t_{11}/2)$. Here, the travel speed v of the signal and the diffraction signal is determined in advance by a type of the transmitted signal and a material of the inspection object 1.

Accordingly, the distance $S_1$ from the first probe unit 100 to the defect P may be calculated by the time difference $t_{11}$ between a transmission time of the signal transmitted from the first probe unit 100 and a reception time of the diffraction signal received by the first probe unit 100, and the distance $S_2$ from the second probe unit 200 to the defect P may be calculated by the time difference $t_{12}$ between the transmission time of the signal transmitted from the first probe unit 100 and a reception time of the diffraction signal received by the second probe unit 200.

An interval L between the first probe unit 100 and the second probe unit 200 is adjustable. The interval L between the first probe unit 100 and the second probe unit 200 is adjusted by the user and is determined by the interval L between the first probe unit 100 and the second probe unit 200, which has been adjusted at the time of detecting the defect P.

The defect depth H from the inspection surface F to the defect P may be calculated by the following process. First, when an angle formed by the signal transmitted from the first probe unit 100 with the inspection surface F is θ, the defect depth H from the inspection surface F to the defect P is calculated by the following Equation 1 and Equation 2.

$$H = S_1 \sin\theta = S_1\sqrt{1 - \cos^2\theta} \ (\because \sin^2\theta + \cos^2\theta = 1) \quad \text{[Equation 1]}$$

$$\cos\theta = \frac{S_1^2 + L^2 - S_2^2}{2S_1 L} \ (\because \text{The second law of cosines}) \quad \text{[Equation 2]}$$

Accordingly, when the Equation 1 and Equation 2 are simultaneously calculated, the defect depth H from the inspection surface F to the defect P may be expressed as the following Equation 3.

$$H = S_1 \sqrt{1 - \left(\frac{S_1^2 + L^2 - S_2^2}{2S_1 L}\right)^2} \quad \text{[Equation 3]}$$

where the defect depth H calculated as the above indicates a distance in a perpendicular direction from the inspection surface F.

However, as described above, since the signal transmitted from the first probe unit 100 spreads and travels in a circular arc shape inside the inspection object 1, it may not be seen that the defect P may be always present in a perpendicular direction from the inspection surface F, even in case where the diffraction signal is received by the first probe unit 100 and the second probe unit 200.

Accordingly, the first probe unit 100 and the second probe unit 200 may be moved in a direction crossing the straight line for connecting between the first probe unit 100 and the second probe unit 200. In other words, when the defect P is present in a direction perpendicular to the inspection surface F, the intensity of the diffraction signal generated from the defect represents the largest value. Therefore, it is possible to more accurately calculate the defect depth H than a case where the first probe unit 100 and the second probe unit 200 are moved in a direction crossing the straight line for connecting between the first probe unit 100 and the second probe unit 200, intensities of the diffraction signals are compared, and the defect depth H is calculated at a position where the diffraction signal has the largest intensity.

In addition, a planar defect distance $D_1$ or $D_2$ from the first probe unit 100 or the second probe unit 200 to the defect P along the inspection surface F is calculated according to the following Equation 4.

$$S_1^2 (\text{or } S_2^2) = D_1^2 (\text{or } D_2^2) + H^2 (\because \text{Pythagorean theorem}) \quad \text{[Equation 4]}$$

Accordingly, from Equation 4, a planar defect distance $D_1$ or $D_2$ from the first probe unit 100 or the second probe unit 200 to the defect P along the inspection surface F may be expressed as the following Equation 5.

$$D_1 (\text{or } D_2) = \sqrt{S_1^2 (\text{or } S_2^2) - H^2} \quad \text{[Equation 5]}$$

In other words, according to an apparatus for detecting a defect and a method for detecting a defect using the same according to embodiments of the present invention, the position of the defect P present inside the inspection object 1 may be accurately detected by receiving, by the first probe unit 100 that has transmitted a signal into the inspection object 1, the diffraction signal generated by the defect.

Furthermore, regardless of a signal transmission angle θ in case where the signal spreads and travels inside the inspection object 1, the position of the defect P may be detected by detecting the position of the defect P using the interval L between the first probe unit 100 and the second probe unit 200, the distance $S_1$ from the first probe unit 100 to the defect P, and the distance $S_2$ between the second probe unit 200 to the defect P.

Figure 5:
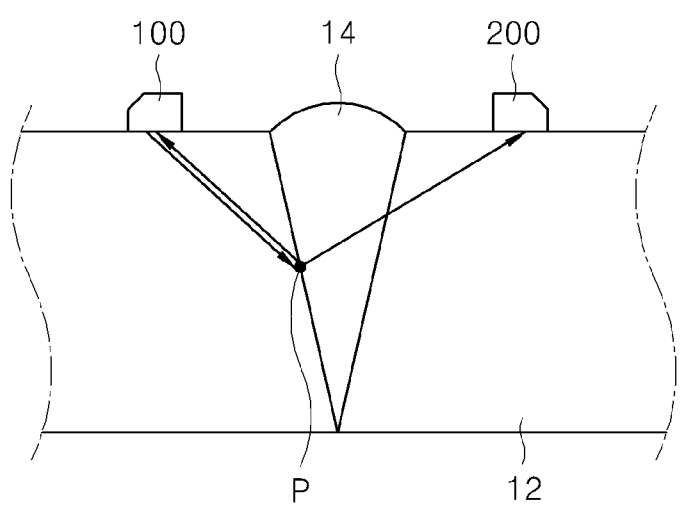
FIG. 5 illustrates a case where an apparatus for detecting a defect is used for detecting a defect in a weld zone according to another exemplary embodiment.

FIG. 5 illustrates in case where an apparatus for detecting a defect is used for detecting a defect of a weld zone according to another exemplary embodiment.

The TOFD method is a technique developed for basically detecting the defect P present inside the inspection object, and may be effectively applied to a non-destructive testing for a weld zone such as a pipe. In other words, when a basic material 12 including the weld zone 14 is an inspection object, the defect P is generated by a weld gap, lack of fusion, lack of dissolution, slag insertion, blow hole, worm hole, inclusion of foreign material, etc., between the basic material 12 and the weld zone 14, and the inspection object and the defect P form a discontinuity of which types of the materials are different and generate a diffraction signal due to transmission of a wave signal.

Accordingly, an apparatus for detecting a defect according to an embodiment of the present invention may be installed on the basic material 12 and used to detect the above-described defect P generated by the weld zone 14. In other words, the apparatus for detecting a defect may be applied to a non-destructive test for the depth or height of the defect P in the weld zone 14 of a thick pipe and may detect the accurate position of the defect P using the interval L between the first probe unit 100 and the second probe unit 200, the distance $S_1$ from the first probe unit 100 to the defect P, and the distance $S_2$ between the second probe unit 200 to the defect P.

Figure 6:
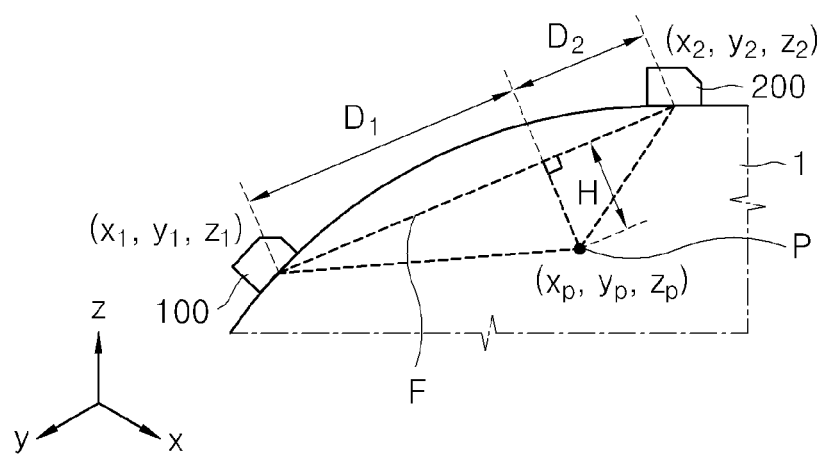
FIG. 6 illustrates how to calculate defect coordinates according to another embodiment.

FIG. 6 illustrates how to calculate defect coordinates according to another embodiment.

Referring FIG. 6, an apparatus for detecting a defect according to an embodiment of the present invention may further include a display unit 400 such as a monitor for displaying a three-dimensional position coordinates of the defect P determined by the position determining unit 300 which determines a defect position inside the inspection object 1 using the diffraction signal received by the first probe unit 100 and the diffraction signal received by the second probe unit 200.

As described above, when power is supplied to the first probe unit 100 and the second probe unit 200, the first probe unit 100 generates an electrical signal and the electrical signal is converted to a wave signal to be transmitted into the inspection object 1. When the defect P is not present inside the inspection object 1, at least one of the first probe unit 100 and the second probe unit 200 movably installed along the surface of the inspection object 1 is moved to detect the defect P, and when the diffraction signal is detected, the defect position inside the inspection object 1 is determined by the position determining unit 300.

Here, as the first probe unit 100 and the second probe unit 200 are moved to detect the defect P, position coordinates thereof are determined. In other words, one of the first probe unit 100 and the second probe unit 200 is moved by the user on the surface of the inspection object 1 until the defect P is detected, and at the time of detecting the defect P, the first probe unit 100 may have position coordinates of $(x_1, y_1, z_1)$ and the second probe unit 200 may have position coordinates $(x_2, y_2, z_2)$.

Here, the position determining unit 300 determines the defect position using the interval L between the first probe unit 100 and the second probe unit 200, the distance $S_1$ from the first probe unit 100 to the defect P, and the distance $S_2$ between the second probe unit 200 to the defect P, and the defect position includes information about the defect depth H to the defect P from the inspection surface F for connecting between the first probe unit 100 and the second probe unit 200 and the planar defect distance ($D_1$ or $D_2$) to the defect P from the first probe unit 100 or the second probe unit 200 along the inspection surface F.

Accordingly, the position determining unit 300 may determine the three-dimensional position coordinates $(x_p, y_p, z_p)$ of the defect P by adding, to the position coordinates $(x_1, y_1, z_1)$ of the first probe unit 100 and the position coordinate $(x_2, y_2, z_2)$ of the second probe unit 200, information about the defect depth H to the defect P from the inspection surface F for connecting between the first probe unit 100 and the second probe unit 200 and the planar defect distance ($D_1$ or $D_2$) to the defect P from the first probe unit 100 or the second probe unit 200 along the inspection surface F.

For example, when the first probe unit 100 has position coordinates (0,0,0) and the second probe unit 200 is separately disposed by L in an X-axis direction to have position coordinates (L, 0, 0), the three-dimensional position coordinates of the defect P is determined as ($D_1$, 0, −H). In addition, when the defect P is not detected at the above-described position but detected by moving, by $Y_1$, the first probe unit 100 and the second probe unit 200 in a Y-axis direction crossing the straight line for connecting between the first probe unit 100 and the second probe unit 200, the three-dimensional coordinates of the defect P is determined as $(D_1, Y_1, -H)$.

In the above, it is exemplified that the first probe unit 100 and the second probe unit 200 are disposed on the X-Y plane, but it is natural that the three-dimensional position coordinates $(x_p, y_p, z_p)$ of the defect P may be determined from the position coordinate $(x_1, y_1, z_1)$ of the first probe unit 100 and the position coordinate $(x_2, y_2, z_2)$ of the second probe unit 200, even when the first probe unit 100 and the second probe unit 200 are not disposed on the same axis or at least one of the first probe unit 100 and the second probe unit 200 is moved in a Z-axis direction and disposed. In addition, as illustrated in FIG. 6, even when the surface of the inspection object 1 is formed to be curved, regardless of the shape of the inspection object 1, the three-dimensional position coordinates $(x_p, y_p, z_p)$ of the defect may be determined from the position coordinates $(x_1, y_1, z_1)$ of the first probe unit 100 and the position coordinates $(x_2, y_2, z_2)$ of the second probe unit 200.

The determined three-dimensional position coordinates $(x_p, y_p, z_p)$ of the defect P is displayed to the user on the display unit 400 and if necessary, a separate storage unit for storing the three-dimensional position coordinates $(x_p, y_p, z_p)$ of the defect P may be further provided.

In this way, according to an apparatus for detecting a defect and a method for detecting a defect using the same of the present invention, since the three-dimensional position of the defect P may be accurately calculated according to coordinates of the first probe unit 100 and the second probe unit 200 on the inspection object, the configuration of the apparatus may be simplified and accordingly, a cost may be reduced and a detection speed may be improved.

Hereinafter, a method for detecting a defect according to an embodiment of the present invention will be described. In relation to the method for detecting a defect, the above-described detailed configuration of the apparatus for detecting a defect may be identically applied and thus overlapping descriptions will be omitted.

Figure 7:
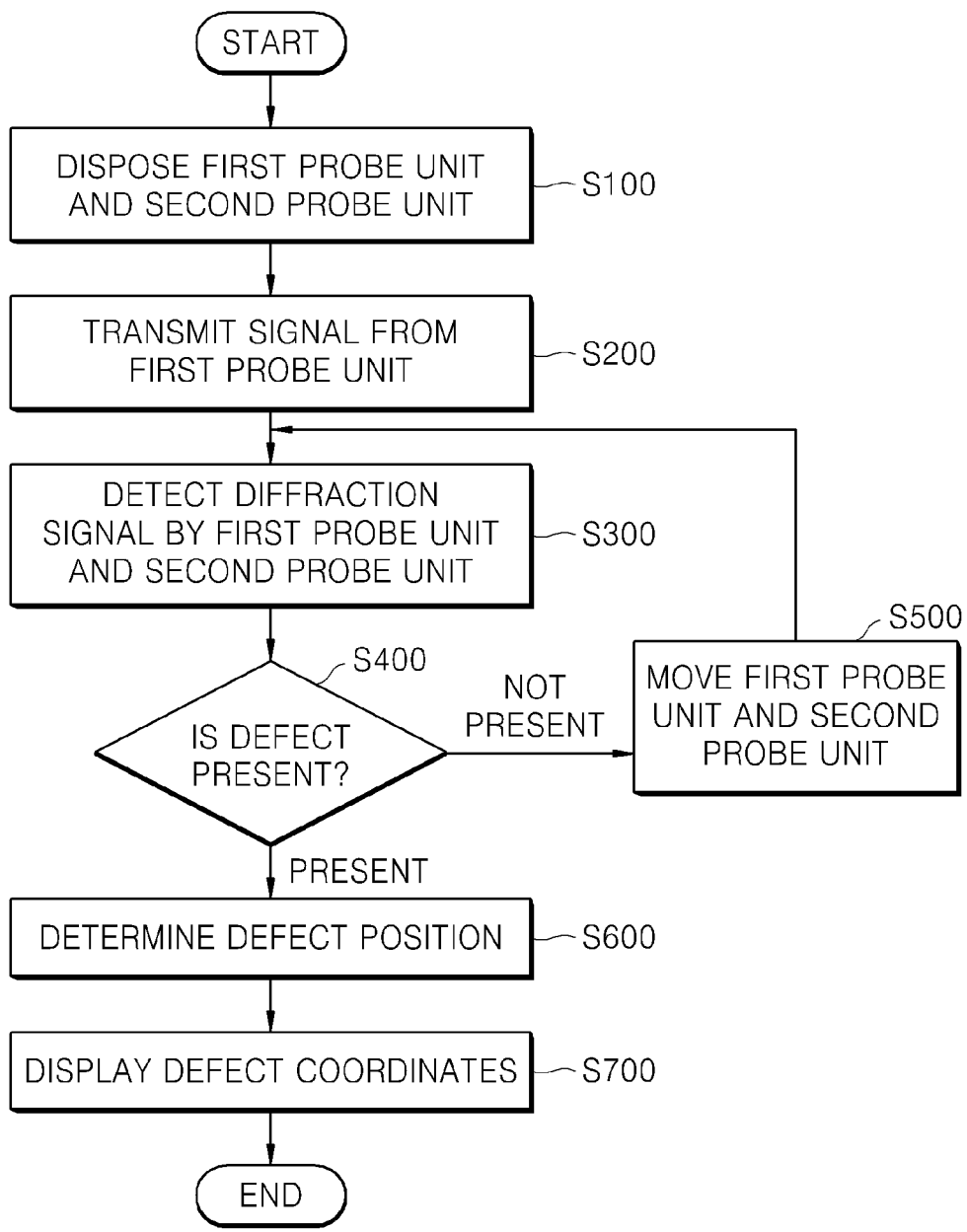
FIG. 7 schematically illustrates a method for detecting a defect according to another embodiment.

FIG. 7 schematically illustrates a method for detecting a defect according to another embodiment.

The method for detecting a defect according to an embodiment of the present invention includes: a process S100 for separately disposing the first probe unit 100 and the second probe unit 200 on the surface of the inspection object 1; a process S200 for transmitting a signal into the inspection object 1 from the first probe unit 100; a process S300 for sensing a signal generated inside the inspection object 1 by the first probe unit 100 and the second probe unit 200; and a process S400 for determining whether the defect P is present inside the inspection object 1.

In process S100 for separately disposing the first probe unit 100 and the second probe unit 200 on the surface of the inspection object 1, the first probe unit 100 and the second probe unit 200 to be movably installed on the surface of the inspection object 1 are separately disposed. Here, as described above, the first probe unit 100 and the second probe unit 200 may directly contact to be installed on the surface of the inspection object 1 or may be separated in a constant interval and contactlessly installed on the surface of the inspection object 1.

In process S200 for transmitting a signal into the inspection object 1 from the first probe unit 100, a wave signal is transmitted into the inspection object 1 from a first transmitter 110 of the first probe unit 100 formed of a piezoelectric element or a laser. Here, for the signal to be transmitted and spread inside the inspection object 1, the first probe unit 100 may transmit the signal toward a lower portion of the second probe unit 200 so as to be inclined to the surface of the inspection object 1, and in this case, an angle between the surface of the inspection object 1 and the transmission signal may be 45° to 70°.

In process S300 for sensing a signal generated inside the inspection object 1 by the first probe unit 100 and the second probe unit 200, it is detected whether a diffraction signal generated by the defect P from the signal transmitted from the first probe unit 100 is received by the first probe unit 100 and the second probe unit 200. In other words, when the defect P is not present inside the inspection object 1, only a surface signal propagated along the surface of the inspection object 1 and a back wall signal reflected by a back wall are received with respect to the signal transmitted from the first probe unit 100, and the diffraction signal is not received by the first probe unit 100 and the second probe unit 200. In addition, when the defect P is present inside the inspection object 1, the first probe unit 100 and the second probe unit 200 receive the diffraction signal generated by the defect P.

In process S400 for determining whether the defect P is present inside the inspection object 1, it is determined whether the defect P is present inside the inspection object 1 from the signals detected by the first probe unit 100 and the second probe unit 200. In other words, when the diffraction signal is not detected by the first probe unit 100 and the second probe unit 200, it may be determined that the defect P is not present inside the inspection object 1 according to current positions of the first probe unit 100 and the second probe unit 200, and when the diffraction signal is detected by the first probe unit 100 and the second probe unit 200, it may be determined that the defect P is present inside the inspection object 1 according to the current positions of the first probe unit 100 and the second probe unit 200.

Here, when the diffraction signal is not received by the first probe unit 100 and the second probe unit 200 and the defect P is not determined to be present, a process S500 is performed in which at least one of the first probe unit 100 and the second probe unit 200 is moved along the surface of the inspection object 1 and detection for the defect P is continuously performed on the entire surface of the inspection object 1.

In addition, in process S500 for moving at least one of the first probe unit 100 and the second probe unit 200 along the surface of the inspection object 1, the first probe 100 and the second probe unit 200 may be moved by the same distance in the same direction, while a certain interval is maintained. Here, the first probe unit 100 and the second probe unit 200 may be moved in a direction crossing the straight line for connecting between the first probe unit 100 and the second probe unit 200, and in this case, the diffraction signal may be detected by integrally modifying a signal transmission position of the first probe unit 100 and signal reception positions of the first probe unit 100 and the second probe unit 200 and thus the defect P may be efficiently detected by preventing an overlapping test for the entire surface of the inspection object 1.

On the other hand, when the diffraction signal is detected by the first probe unit 100 and the second probe unit 200 and the defect is determined to be present, an accurate position of the defect P is determined by performing a process S600 for determining a defect position inside the inspection object 1 using the diffraction signal received by the first probe unit 100 and the diffraction signal received by the second probe unit 200.

Here, in process S600 for determining a defect position inside the inspection object 1, the defect position inside the inspection object 1 may be determined using the interval L between the first probe unit 100 and the second probe unit 200, the distance $S_1$ from the first probe unit 100 to the defect P, and the distance $S_2$ between the second probe unit 200 to the defect P, and the defect depth H to the defect P from the inspection surface F for connecting between the first probe unit 100 and the second probe unit 200 and the planar defect distance ($D_1$ or $D_2$) to the defect P from the first probe unit 100 or the second probe unit 200 along the inspection surface F may be determined. A detailed process for calculating the defect depth H to the defect P from the inspection surface F for connecting between the first probe unit 100 and the second probe unit 200 and the planar defect distance ($D_1$ or $D_2$) to the defect P from the first probe unit 100 or the second probe unit 200 along the inspection surface F using the interval L between the first probe unit 100 and the second probe unit 200, the distance $S_1$ from the first probe unit 100 to the defect P, and the distance $S_2$ between the second probe unit 200 to the defect P is the same as described above in relation to the apparatus for detecting a defect according to an embodiment of the present invention, and therefore overlapping descriptions thereabout will be omitted.

When the defect depth H to the defect P from the inspection surface F for connecting between the first probe unit 100 and the second probe unit 200, and the planar defect distance ($D_1$ or $D_2$) to the defect P from the first probe unit 100 or the second probe unit 200 along the inspection surface F are determined as the above-described, a process S700 may be performed in which a defect coordinate is displayed using the coordinates of the first probe unit 100 and the second probe unit 200, the defect depth H and the planar defect distance ($D_1$ or $D_2$).

In process 700 for displaying the defect coordinates, the position determining unit 300 may determine the three-dimensional position coordinates ($x_p$, $y_p$, $z_p$) of the defect by adding, to each of position coordinates according to movements of the first probe unit 100 and the second probe unit 200, information about the defect depth H to the defect P from the inspection surface F for connecting between the first probe unit 100 and the second probe unit 200, and the planar defect distance ($D_1$ or $D_2$) to the defect P from the first probe unit 100 or the second probe unit 200 along the inspection surface F. The determined three-dimensional coordinates of the defect P are displayed to the user on the display unit 400 and if necessary, the defect coordinate may be separately stored.

Although the embodiments of the present invention have been disclosed and illustrated using the specific terms, those skilled in the art will appreciate that such terms are merely used to clearly describe the present invention, and various modifications and variations of the embodiments of the present invention are possible, without departing from the scope and spirit of the invention as disclosed in the accompanying claims. The modified embodiments should not be understood separately from the spirit and scope of the invention and should be considered as belonging to the appended claims of the invention

What is claimed is:

1. An apparatus for detecting a defect comprising:
   a first probe unit comprising a first transmitter for transmitting a signal into an inspection object and a first receiver for receiving a signal generated inside the inspection object;
   a second probe unit separately installed from the first probe unit and configured to receive the signal generated inside the inspection object; and
   a position determining unit configured to detect a defect position inside the inspection object using the signal received by the first probe unit and the signal received by the second probe unit,
   wherein the position determining unit determines the defect position inside the inspection object by calculating each of a distance (L) between the first probe unit and the second probe unit, a distance ($S_1$) from the first probe unit to the defect, and a distance ($S_2$) from the second probe unit to the defect.

2. The apparatus of claim 1, wherein the first probe unit and the second probe unit are movably installed along a surface of the inspection object.

3. The apparatus of claim 1, wherein the signal generated inside the inspection object comprises a diffraction signal that the signal transmitted from the first probe unit is diffracted by a defect.

4. The apparatus of claim 1, wherein the distance $S_1$ from the first probe unit to the defect is calculated using a difference between transmission time of the signal transmitted from the first probe unit and a reception time of the signal received by the first probe unit, and a travel speed of the signal inside the inspection object.

5. The apparatus of claim 4, wherein the distance $S_2$ from the second probe unit to the defect is calculated using a difference between the transmission time of the signal transmitted from the first probe unit and a reception time of the signal received by the second probe unit, the travel speed of the signal inside the inspection object, and the distance $S_1$ from the first probe unit to the defect.

6. The apparatus of claim 1, wherein the defect position comprises information about a defect depth H to the defect from an inspection surface for connecting between the first probe unit and the second probe unit, and information about planar defect distance ($D_1$ or $D_2$) to the defect from the first probe unit or the second probe unit along the inspection surface.

7. The apparatus of claim 6, wherein the defect depth H from the inspection surface to the defect is calculated by the following Equation 1, $$H = S_1 \sqrt{1 - \left(\frac{S_1^2 + L^2 - S_2^2}{2S_1 L}\right)^2}. \qquad \text{[Equation 1]}$$

8. The apparatus of claim 7, wherein the planar defect distance ($D_1$ or $D_2$) to the defect from the first probe unit or the second probe unit along the inspection surface is calculated by the following Equation 2, $$D_1(\text{or } D_2) = \sqrt{S_1^2(\text{or} S_2^2) - H^2}. \qquad \text{[Equation 2]}$$

9. The apparatus of claim 1, wherein the signal transmitted from the first probe unit comprises an ultrasonic wave signal.

10. A method for detecting a defect, the method comprising:
    a process of separately disposing a first probe unit comprising a first transmitter for transmitting a signal into an inspection object and a first receiver for receiving a signal generated inside the inspection object and a second probe unit configured to receive the signal generated inside the inspection object on a surface of an injection object;
    a process of transmitting a signal into the inspection object from the first probe unit;

a process of detecting, by the first probe unit and the second probe unit, a signal generated inside the inspection object;

a process of determining whether a defect is present inside the inspection object from the signals detected by the first probe unit and the second probe unit; and a process of determining a defect position inside the inspection object using the signal received by the first probe unit and the signal received by the second probe unit when it is determined that the defect is present inside the inspection object, wherein the process of determining the defect position inside the inspection object determines the defect position inside the object by calculating each of a distance between the first probe unit and the second probe unit, a distance from the first probe unit to the defect, and a distance from the second probe unit to the defect.

11. The method of claim 10, wherein, in the process transmitting of the signal into the inspection object, the signal is transmitted toward a lower portion of the second probe unit.

12. The method of claim 10, further comprising:

a process of moving at least one of the first probe unit and the second probe unit along the surface of the inspection object, when the defect is not determined to be present inside the inspection object.

13. The method of claim 10, wherein, in the process of determining of the defect position inside the inspection object, a defect depth H to the defect from an inspection surface for connecting between the first probe unit and the second probe unit, and a planar defect distance ($D_1$ or $D_2$) to the defect P from the first probe unit or the second probe unit along the inspection surface are determined.

14. The method of claim 13, further comprising:

a process of displaying position coordinates of a defect using position coordinates of the first probe unit and the second probe unit, the defect depth H and the planar defect distance $D_1$ or $D_2$.

* * * * *